United States Patent [19]

Pouliquen et al.

[11] Patent Number: 5,432,694
[45] Date of Patent: Jul. 11, 1995

[54] METHOD OF REGULATING A VOLTAGE INVERTER OPERATING IN QUASI-RESONANCE

[75] Inventors: Hervé Pouliquen; Khaled Elloumi, both of Clamart, France

[73] Assignee: Electricite de France-Service National, Paris, France

[21] Appl. No.: 211,086

[22] PCT Filed: Feb. 28, 1994

[86] PCT No.: PCT/FR92/00822

§ 371 Date: Apr. 26, 1994

§ 102(e) Date: Apr. 26, 1994

[87] PCT Pub. No.: WO93/04525

PCT Pub. Date: Mar. 4, 1993

[30] Foreign Application Priority Data

Aug. 26, 1991 [FR] France ................ 91 10607

[51] Int. Cl.[6] ................................ H02M 7/5387
[52] U.S. Cl. ................................ 363/98; 363/132
[58] Field of Search ............... 363/17, 58, 98, 132, 363/136

[56] References Cited

PUBLICATIONS

Patent Abstracts of Japan, vol. 14, No. 125 Mar. 8, 1990 & JP-1,318,547, (NEC) Dec. 25, 1989.
Zero-Switching-Loss inverters for High-Power Applications; Divan & Skibinsky, IEEE Transactions on Application and Industry, vol. 25, No. 4, Aug. 1989, New York US, pp. 634–643.
Pulse Width Modulation with Resonant DC Link Converters; Venkataramanan & Divan; Conf. Rec IEEE Industry Application Society Annual Meeting, vol. II, Oct. 1990, Seattle Washington US, pp. 984–990.
A Synchronized Resonant DC Link Converter for Soft-Switching PWM; Tenti, Divan & Tiogo; Conf Rec IEEE Industry Applications Society Annual Meeting, vol. I. Oct. 1989, San Diego, Calif. US, PP. 1037–1044.
Delta Modulation Strategies for Resonant Link Inverters, Kheraluwala & Divan; PESC '87 Record 1987, Blacksburg, Va US, pp. 271–278.

*Primary Examiner*—Thomas M. Dougherty
*Assistant Examiner*—Shawn Riley
*Attorney, Agent, or Firm*—Sughrue, Mion, Zinn, Macpeak & Seas

[57] ABSTRACT

Method of regulating a voltage inverter operating in quasi-resonance, including an inverter bridge with controlled components (transistors, GTO etc.) operating in turned off-saturated mode, and an oscillating circuit arranged on the DC voltage source side, and consisting of an inductor in series with the DC voltage source, and of a capacitor connected in parallel with the inverter bridge, characterized in that pulse-width modulation regulation is carried out, in which the sampling period is very much greater than and of the order of about ten or more times the resonance period of the oscillating circuit.

7 Claims, 3 Drawing Sheets

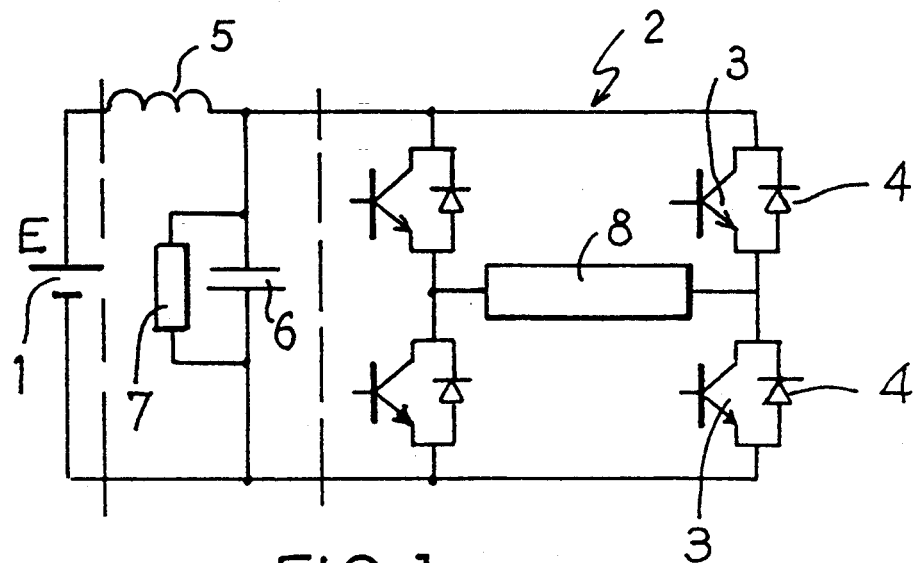
(PRIOR ART) FIG.1
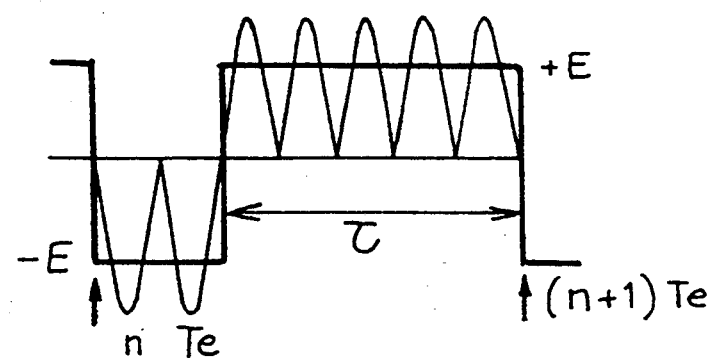
FIG.2

METHOD OF REGULATING A VOLTAGE INVERTER OPERATING IN QUASI-RESONANCE

Method of regulating a voltage inverter operating in quasi-resonance.

The present invention relates to voltage inverters operating in quasi-resonance.

These inverters are supplied with power by a DC voltage source, they include a bridge, single-phase or multi-phase, with controlled components operating in turned off-saturated mode; these inverters include an oscillating circuit arranged on the same side as the DC voltage power supply; it consists of an inductor in series with the DC voltage source, and of a capacitor connected in parallel with the bridge with controlled components.

The starting and the maintenance of the oscillations of the oscillating circuit on the DC voltage source side are performed by successive short-circuits of the capacitor, on the zero-crossings of the voltage at its terminals, that is to say at the resonance frequency of the oscillating circuit. Hence, the energy necessary to sustain the oscillations is regularly stored in the inductor of the oscillating circuit. The short-circuits are provided by the simultaneous closing of the two switches of one of the arms of the bridge.

Moreover, according to the principle of quasi-resonance, any switching of any one of the controlled components of the bridge must substantially coincide with the zero-crossing of the voltage at the terminals of the capacitor of the oscillating circuit.

The conventional regulation methods adapted to inverters operating in quasi-resonance are synchronized to the resonance frequency. This is the case for the modulation known as "Sigma-Delta"; this technique consists in converting a reference signal into a two-level signal according to a synchronization frequency. In effect, the output is compared with a reference and the error obtained is passed through an integrator. The output of the integrator is then quantized into two possible levels, positive or negative, depending on its polarity. The output of the comparator is applied to a logic circuit, sampled at the resonance frequency of the oscillating circuit, in order to produce the control pulses for the voltage inverter. In any event, this method does not take account of the nature of the poles of the charge, or of the characteristics of the model of the inverter operating in the quasi-resonance mode. The only degree of freedom for achieving the desired performance is to increase the sampling frequency, and thus the resonance frequency of the oscillating circuit, which significantly increases the losses by switching.

It results therefrom that the performance of these voltage inverters operating in quasi-resonance mode is limited.

Thus, the object of the present invention is to supply a voltage inverter operating in quasi-resonance mode, in which the losses by switching are significantly reduced, and which can be subject to high-performance digital regulation in order to control the various loads of the inverter.

To that end, the subject of the invention is a method of regulating a voltage inverter operating in quasi-resonance, including an inverter bridge with controlled components operating in turned off-saturated mode, and an oscillating circuit arranged on the DC voltage side and consisting of an inductor in series with the DC voltage source, and of a capacitor connected in parallel with the bridge with controlled components, characterized in that pulse-width modulation regulation is carried out, in which the sampling period is very much greater than and of the order of about ten or more times the resonance period of the oscillating circuit.

The invention makes it possible to separate the function of maintaining, by analogue means, the short circuits, at high frequency, which are necessary for sustaining the oscillation, from the regulation function proper. This makes it possible to use digital regulators operating at lower frequencies than the resonance frequency, and which can take into account the characteristics of the load. The invention thus makes it possible to associate the advantages characteristic of high-frequency resonance, namely the reduction in volume and the efficiency, with those of digital control, namely flexibility of processing, adaptability and optimization.

The voltage pulses applied by the output of the regulation consists of a series of periods of sinusoids at the resonance frequency. These pulses are positioned only at discrete instants which correspond to the zero-crossing of the voltage at the terminals of the capacitor which is in parallel with the bridge.

Advantageously, a peak limiter is arranged in parallel with the said capacitor of the oscillating circuit; this peak limiter limits the voltage at the terminals of the capacitor, during the switchings, to a voltage slightly higher than double the DC power supply voltage, E.

Other characteristics and advantages of the invention will emerge from the description which follows of embodiments of the invention, given by referring to the attached drawings in which:

FIG. 1 is the diagram of a conventional voltage inverter operating in quasi-resonance;

FIG. 2 illustrates the principle of the method according to the invention;

Figure 3:
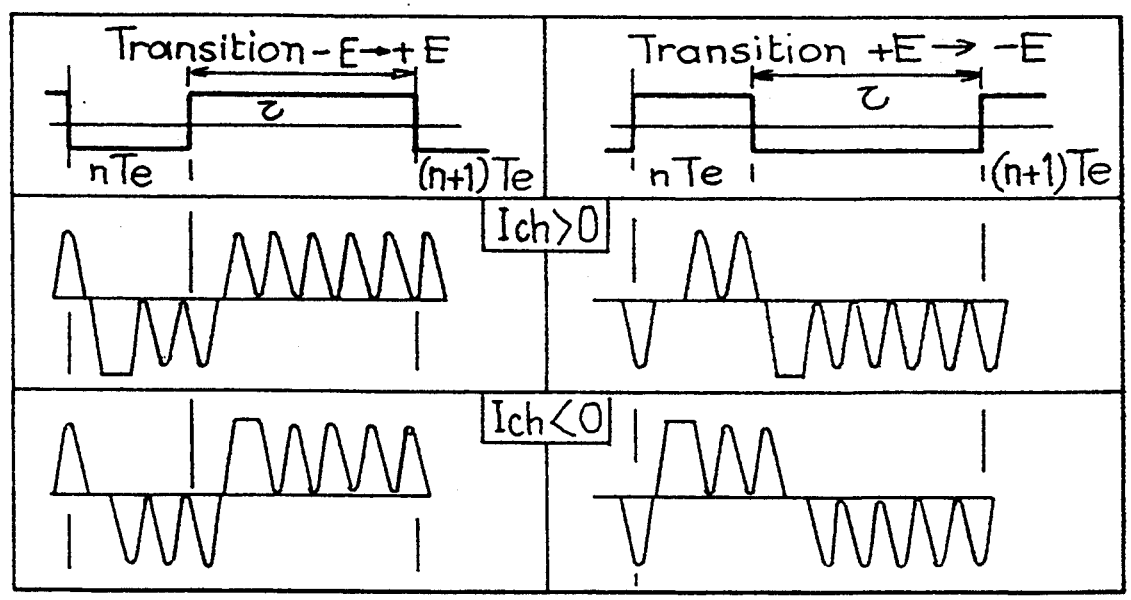
FIG. 3 is a table indicating the shapes of the output voltage from the inverter according to the various transition commands.

FIG. 1 is the diagram of a conventional voltage inverter operating in quasi-resonance. A DC voltage source 1, of voltage E, applies power to a bridge with controlled components 3 operating in turned off-saturated mode, that is to say with controlled triggering and turning-off; a freewheel diode 4 is arranged in parallel with each of the controlled components 3.

The operation in quasi-resonance is obtained by virtue of an oscillating circuit arranged on the DC voltage side; it consists of an inductor 5 in series with the DC voltage source 1, and of a capacitor 6 in parallel with the bridge 2. The load 8 which is to be supplied with power by voltage waves, in such a way as to have a sinusoidal alternating current passing through it, is arranged between two points situated between the controlled components on each of the arms of the inverter. In a known way, a peak limiter device 7 is connected in parallel with the capacitor 6. This peak limiter limits the voltage at the terminals of the capacitor to a value slightly higher than double the voltage, E, of the DC voltage source 1.

FIG. 2 illustrates the principle of the method according to the invention. The regulation of the alternating current supplied by the inverter is performed by a method of conventional pulse-width modulation with a regular sampling period Te very much greater than and of the order of about at least ten or more times the period of the resonating circuit consisting of the inductor 5 and the capacitor 6.

This is shown diagrammatically in FIG. 2 which represents the control strobe output by the regulation and the ideal shape of the voltage at the terminals of the load 8 in the method in accordance with the present invention. It is seen that the regulation is performed by a conventional pulse-width modulation method with a single transition in the course of the sampling period; in the present case it consists of a transition from the value $-E$ (DC power supply voltage) to the value $+E$; the transition from $+E$ to $-E$ thus substantially coincides with the end of the sampling period. The duration $\tau$ of the pulse of the pulse-width modulation control corresponds to a series of positive sinusoidal waves at the resonance frequency.

FIG. 2 represents the theoretical form of the voltage at the terminals of the load 8. The deformations with respect to this theoretical form are due to the phenomenon of switching. The modelling of the system above all requires standardization of the wave form during one sampling period Te.

The FIG. 3 represents the various possible cases for applying the transition command according to whether the pulse is left aligned or right aligned and according to whether the current of the load Ich is positive or negative.

The most troublesome element is the switching which causes an overvoltage at the terminals of the capacitor, an over voltage which is peak-limited by the peak limiter device quoted above. If a type of control is chosen for which the pulse-width modulation control transition, that is to say the transition expected in the course of the sampling interval, passes from $-E$ to $+E$ for a positive load current Ich, and the transition expected in the course of the sampling interval passes from $+E$ to $-E$ for a negative current Ich, then the peak limiting phenomenon is always at the Start of the sampling period.

Consequently, the various switching times T1 and T2, in particular that corresponding to the switching which causes an over voltage at the terminals of the capacitor, which over voltage is peak limited as indicated above, can easily be calculated. In fact, the latter depend on the current in the load, which is a time-variable magnitude, and which can easily be measured at the precise instant of sampling. This calculation is, in fact, necessary in order to obtain the pulse width $\tau$ in a precise way. The time T2 is long if the load current is heavy.

Figure 4:
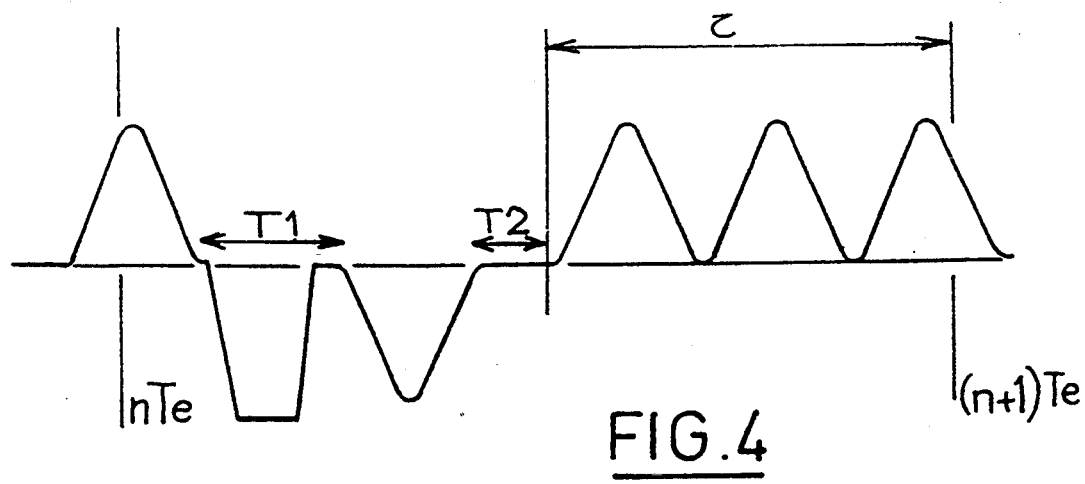
FIG. 4 is a diagram of the voltage at the output of the inverter.

FIG. 4 shows the actual shape of the voltage at the terminals of the load 8 of the alternating circuit for a positive load current Ich. It is seen that the trapezoidal wave form which corresponds to the peak limiting phenomenon is at the start of the sampling period Te.

Figure 5:
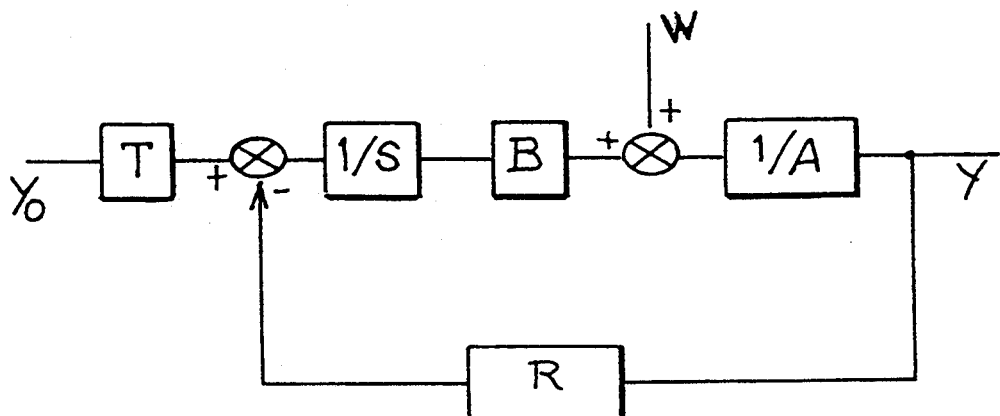
FIG. 5 represents a regulator used to perform the regulation according to the invention.

FIG. 5 represents a regulator used to perform the digital pulse-width modulation regulation according the invention. It takes the form of a conventional RST-type regulator, Yo being the datum value, Y the magnitude to be controlled, here the current in the load. The parameters of the regulator are chosen so that the system has a minimum finite response time. The regulator includes an integrator so as to ensure zero error in steady-state regime. Attempts are also made to set it so that it is robust with respect to possible perturbations.

Figure 6:
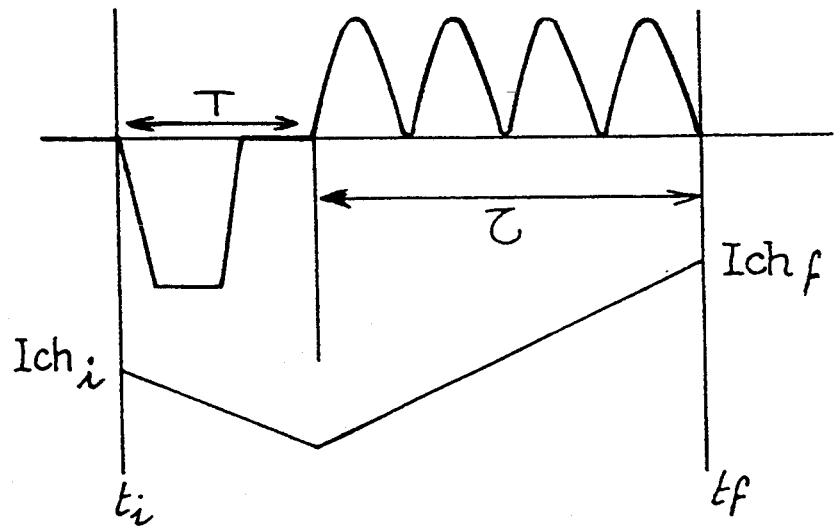
FIG. 6 is a diagram of the voltage at the output of the inverter.

FIG. 6 represents the wave form at the terminals of the load 8 of the alternating circuit in accordance with one variant of the invention. This is an auto-recurrent model with a variable-duration sampling period. The idea of the auto-recurrent method is to fix a well-defined quantity of energy at the start of this period—it is negative if the load current is positive and positive if the load current is negative—and to leave the system the time to compensate for this energy and to reach the regulation reference. The end of the sampling period thus depends on the duration, $\tau$, of the pulse-width modulation control pulse.

As can be seen in FIG. 6, the quantity of energy to be compensated for, which is applied at the start of each period, corresponds to a single sinusoidal half-wave at the resonance frequency and, consequently, due to the choice which has been indicated above, to the period in the course of which the peak limiting of the voltage at the terminals of the capacitor occurs.

This latter method eliminates the uncertainties in placing the transition expected in the course of the sampling interval.

Trials have shown that this regulation device with variable-duration sampling periods allows even better control of the wave form of the load current by minimizing the undesirable low-frequency harmonics. The results obtained with this variant of the invention are very greatly enhanced thereby, the rate of harmonic distortion of the current controlled being reduced by half with respect to the preceding case according to the invention.

If the results obtained by virtue of the method according to the invention are compared with respect to a conventional regulation method, for example of the Sigma-Delta type, it is noted that the performances obtained in steady-state regime are equivalent; in contrast, in accordance with the present invention, the control frequency of the pulse-width modulation regulation is much lower, which gives rise to a significant reduction in the losses by switching, and which makes it possible to use digital correctors or regulators, and thus to enhance performance.

The invention may be applied in particular for supplying power to variable-speed electric motors, for uninterruptable power supplies, etc.

We claim:

1. Method of pulse-width modulation regulation, by means of a digital regulator, of a voltage inverter operating in quasi-resonance, including a bridge (2) of controlled recitfiers (3), operating in turned off-saturated mode, and an oscillating circuit (5,6) arranged on the DC current side and consisting of an inductor (5) in series with the DC current source (1) and of a capacitor (6) connected in parallel with the controlled-rectifier (3) bridge (2), characterized in that a sampling period (Te) of the digital regulator is greater than the resonance period of the oscillating circuit.

2. Method of pulse-width modulation regulation of a voltage inverter operating in quasi-resonance accroding to claim 1, characterized in that the sampling period of the regulator (Te) is equal to about ten times the resonance period of the oscillating circuit.

3. Method of regulating a voltage inverter operating in quasi-resonance according to claim 1, characterized in that the switching pulse at the terminals of the load of the bridge with controlled components is set to the start or the end of a wave with the resonance frequency.

4. Method of regulating a voltage inverter operating in quasi-resonance according to claim 1, characterized in that the transition expected in each sampling period passes from a value (−E) to a value (+E) for a positive load current (Ich) and from the value (+E) to the value (−E) for a negative load current.

5. Method of regulating a voltage inverter operating in quasi-resonance according to claim 1, characterized in that the control pulse output by the regulation is set to the start or to the end of the sampling period.

6. Method of regulating a voltage inverter operating in quasi-resonance according to claim 1, characterized in that a regulator of (RST) type is used for controlling the current in the load, and the output of which is the pulse width.

7. Method of regulating a voltage inverter operating in quasi-resonance according to claim 1 characterized in that the sampling periods are of variable duration and that each sampling period starts with a single period of the voltage at the terminals of the capacitor at the resonance frequency, followed by a variable number of periods of the voltage at the terminals of the capacitor at the resonant frequency, but with an opposite polarity of the voltage.

* * * * *